United States Patent [19]

Nayak

[11] 4,044,369
[45] Aug. 23, 1977

[54] PHOTOGRAPHIC FILM ASSEMBLY AND MAGAZINE THEREFOR

[75] Inventor: Ashok B. Nayak, Tustin, Calif.

[73] Assignee: Bell & Howell Company, Chicago, Ill.

[21] Appl. No.: 540,765

[22] Filed: Jan. 14, 1975

[51] Int. Cl.² ............................................. G03B 17/26
[52] U.S. Cl. ....................................... 354/275; 96/78; 96/83
[58] Field of Search ....................... 354/83, 84, 85, 86, 354/174, 178, 275, 276; 206/449, 455, 820; 96/67, 78, 79, 83

[56] References Cited

U.S. PATENT DOCUMENTS

| 2,572,357 | 10/1951 | Land | 354/86 |
|---|---|---|---|
| 2,778,269 | 1/1957 | Bartlett | 354/86 |
| 3,016,175 | 1/1962 | Wareham et al. | 354/86 X |
| 3,152,529 | 10/1964 | Erlichman | 354/86 |
| 3,249,434 | 5/1966 | Land et al. | 96/78 X |
| 3,521,541 | 7/1970 | Schmidt et al. | 354/85 |
| 3,690,238 | 9/1972 | Nerwin | 354/86 |
| 3,695,755 | 10/1972 | Egnaczak | 354/86 X |
| 3,779,143 | 12/1973 | Harvey | 354/86 |
| 3,941,246 | 3/1976 | Duden | 206/455 |

FOREIGN PATENT DOCUMENTS 1,187,492   4/1970   United Kingdom .................. 354/84

Primary Examiner—Fred L. Braun
Attorney, Agent, or Firm—Benoit Law Corporation

[57] ABSTRACT

A photographic assemblage is formed by a plurality of backing strips interconnected by a continuous sealing strip. In each assemblage, the backing strips carry a selected photographic medium, such as a strip of film or a layer of photodeveloping material. The sealing strip is attached to each backing strip at spaced apart points to cover over the photographic medium thereon, and may be peeled therefrom to dispense one of the backing strips. Several embodiments of cassette type magazines for the assemblages are disclosed. Photographic apparatus for use with the assemblages and cassettes is disclosed which is selectively operable to dispense backing strips carrying film one at a time from one assemblage, expose each frame of the film and develop the film by dispensing a backing strip carrying photodeveloper and moving it into aligned contact with the film. The film may be removed from the photograhic apparatus once developed.

14 Claims, 21 Drawing Figures

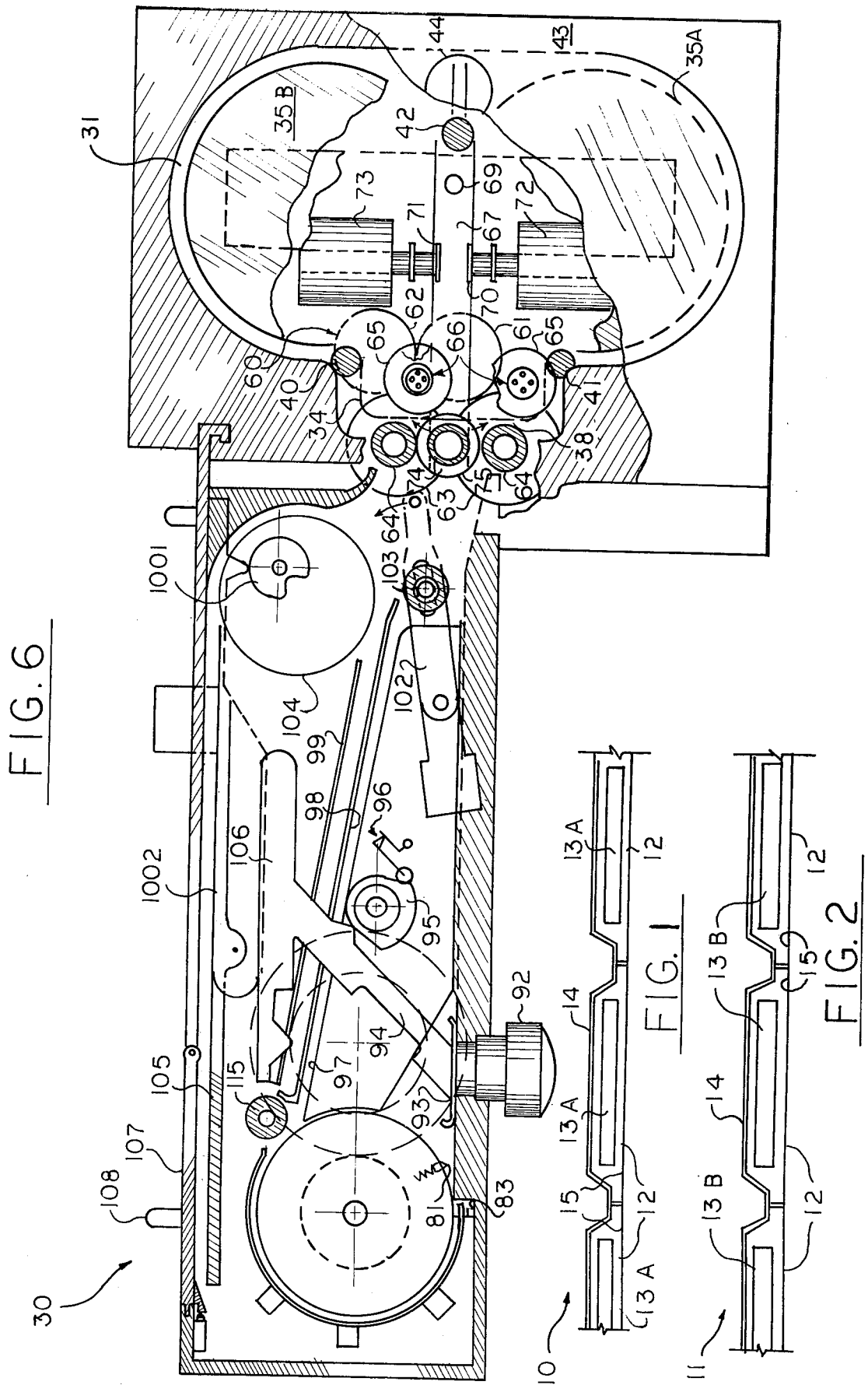

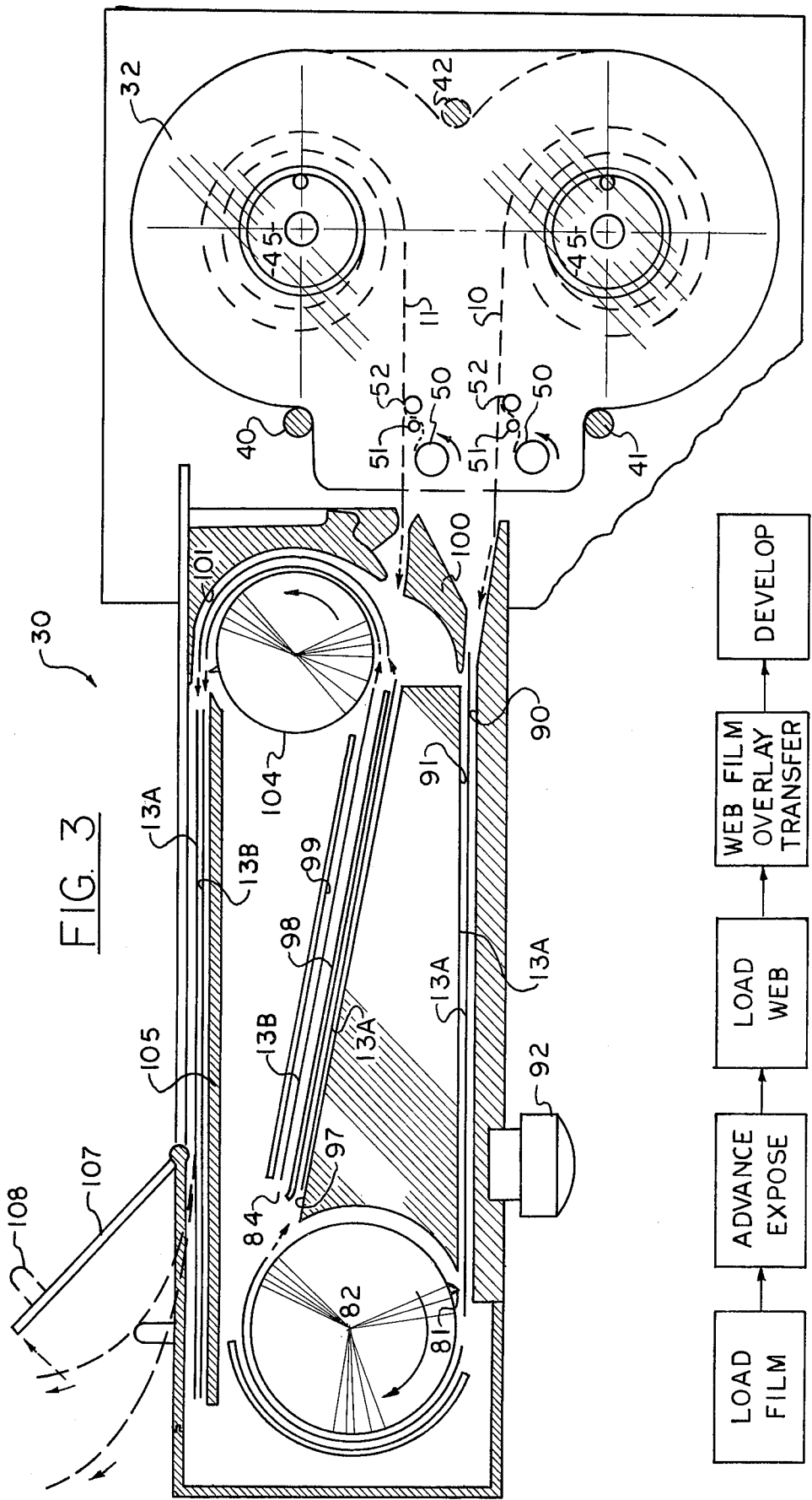

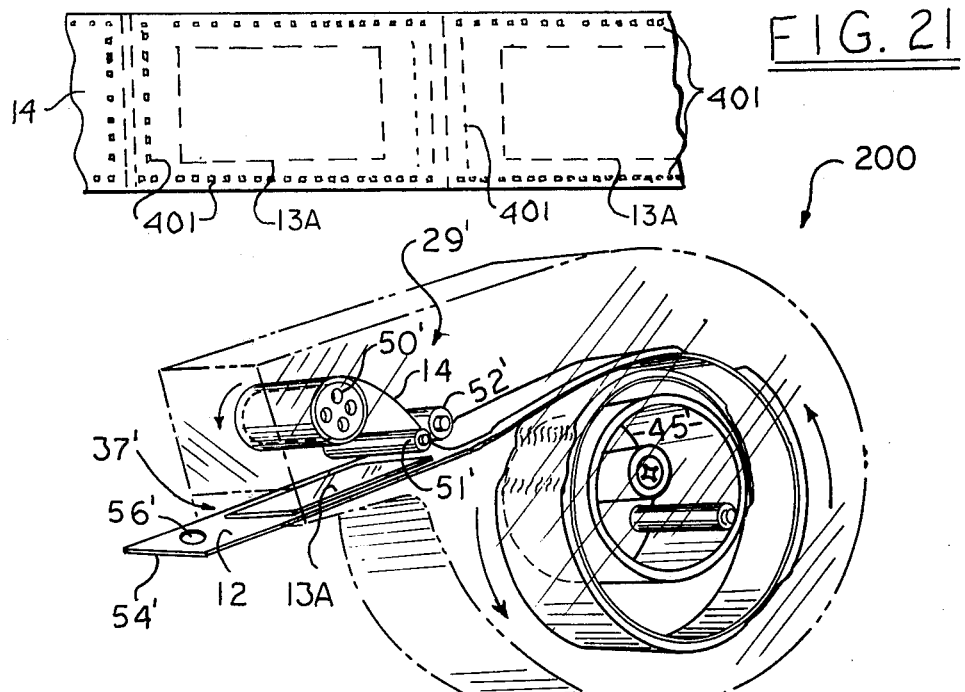
FIG. 21
FIG. 12
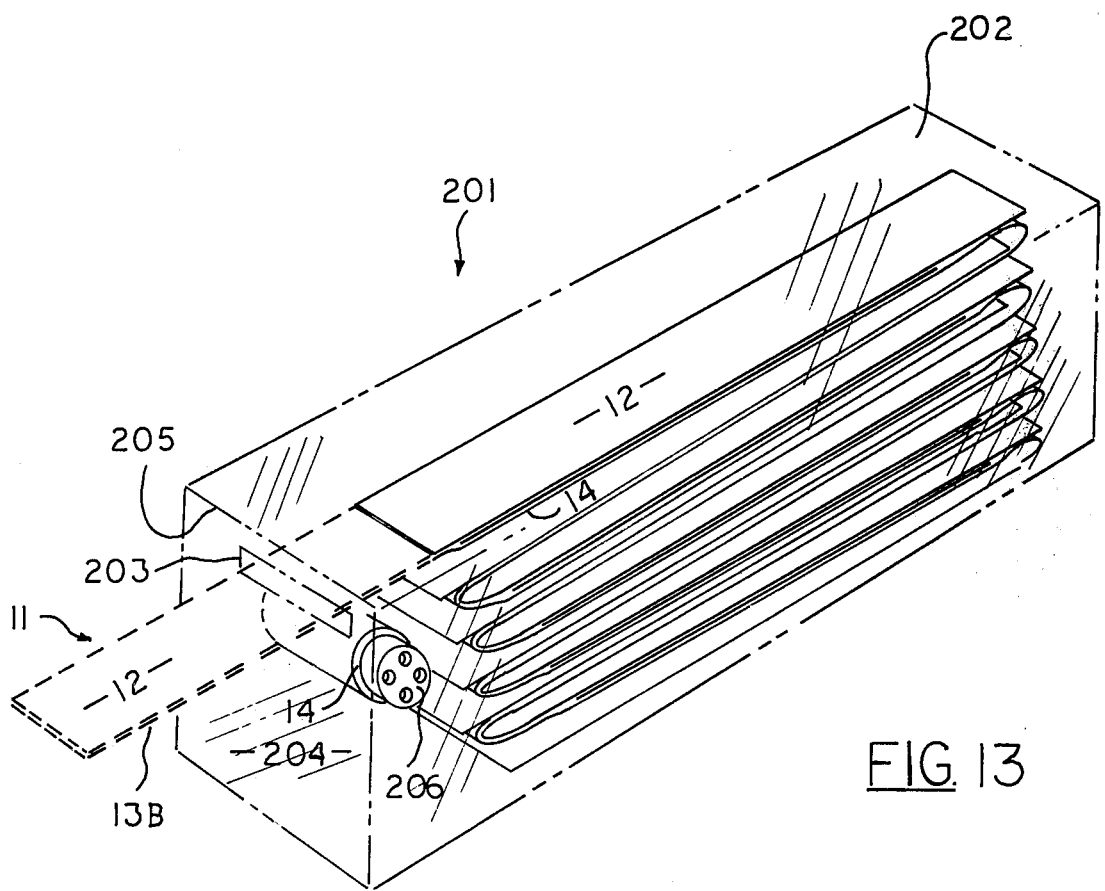
FIG. 13

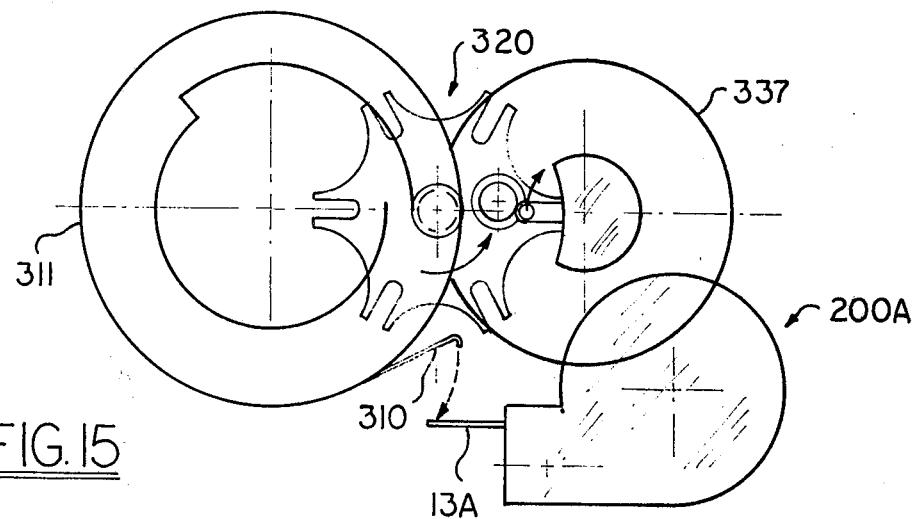
FIG. 15
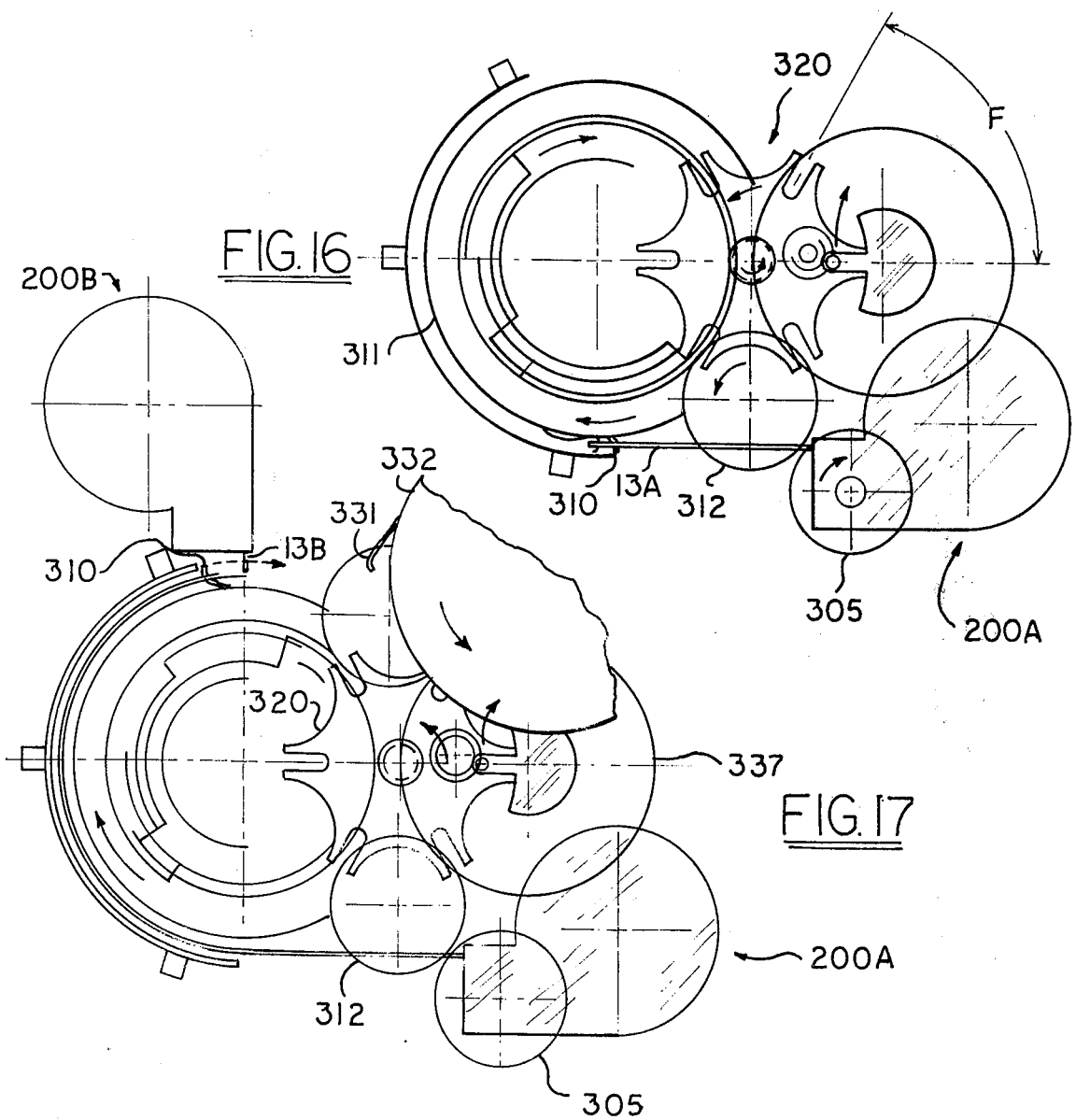
FIG. 16
FIG. 17

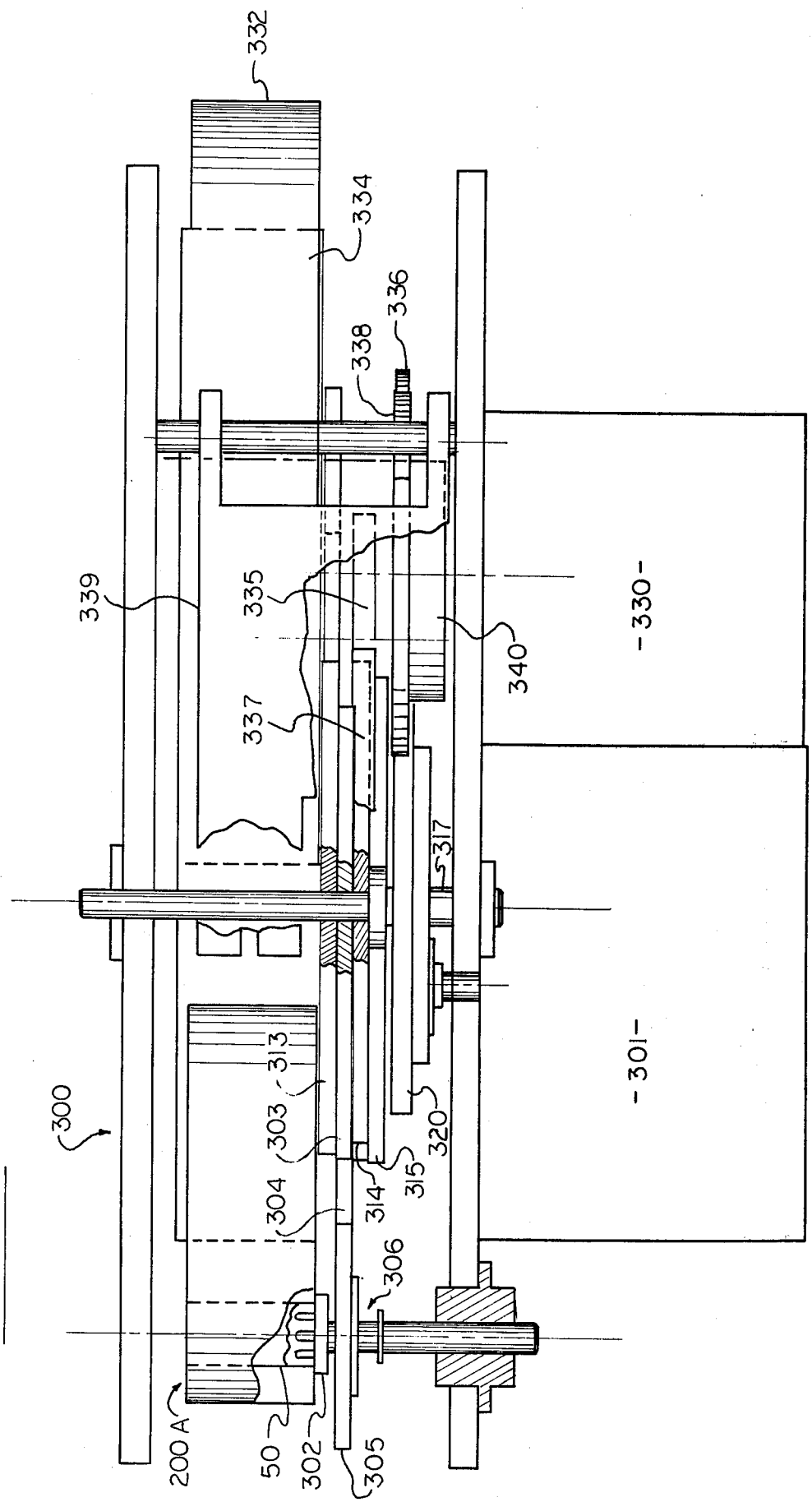

PHOTOGRAPHIC FILM ASSEMBLY AND MAGAZINE THEREFOR

BACKGROUND OF THE INVENTION

The present invention relates to photography and more particularly to self-processing type photographic film and camera equipment.

Heretofore, self-processing type photographic camera apparatus has been developed in which film may be exposed and then immediately developed therein after exposure. A variety of such arrangements have been devised and the present invention is directed to improvements over the prior art arrangements.

SUMMARY OF THE INVENTION

It is an object of the present invention to provide an improved photographic medium assemblage suitable for use in cooperating self-processing type photographic apparatus.

It is another object of the present invention to provide an improved photographic medium assemblage as set forth characterized by having a continuous sealing strip interconnecting a plurality of separate backing strips which each carry a selected photographic medium.

It is additionally an object of the present invention to provide improved cassette type magazines for the improved assemblages suitable for use in cooperating self-processing type camera apparatus.

It is further an object of the present invention to provide improved cassette type magazines as set forth capable of separately dispensing individual backing strips from the improved assemblages while collecting as waste material the sealing strips of the assemblages to prevent litter.

It is yet another object of the present invention to provide an improved cooperating photographic apparatus suitable for use with the improved assemblages.

It is still another object of the present invention to provide an improved self-processing type photographic camera apparatus suitable for use with the improved assemblages and the improved cassette type magazines.

In accomplishing these and other objects, there is provided improved photographic apparatus of the self-processing type, improved photographic assemblages and improved cassette type magazines for the assemblages.

The photographic assemblages are formed by a plurality of backing strips interconnected by a continuous sealing strip. In each assemblage, the backing strips carry a selected photographic medium, such as a strip of film or a layer of photodeveloping material. The sealing strip is attached to each backing strip at spaced apart points to cover over the photographic medium thereon and may be peeled therefrom to dispense one of the backing strips.

Several embodiments of cassette type magazines for the photographic medium assemblages are provided.

Self-processing type cooperating photographic apparatus for use with the assemblages and cassettes is provided, which is selectively operable to dispense backing strips carrying film one at a time from one assemblage, expose each frame of the film and develop the film by dispensing a backing strip carrying photodeveloper and moving it into aligned contact or register with the film.

The film may be removed from the photographic apparatus once developed.

Additional objects of the present invention reside in the specific construction of the embodiments of the present invention hereinafter described in conjunction with the several drawings.

BRIEF DESCRIPTION OF THE DRAWINGS

FIG. 1 is a side elevation view of one photographic medium assemblage according to the present invention in which the photographic medium is film.

FIG. 2 is a side elevation view of another photographic medium assemblage according to the present invention in which the photographic medium is photodeveloping material.

FIG. 3 is a view partially in section of a self-processing photographic apparatus according to the present invention and a cooperating cassette type magazine also constructed according to the present invention.

FIG. 6 is a view taken like in FIG. 3 cutaway to illustrate the internal construction of the photographic apparatus.

FIG. 9 is a flow chart indicating the operational sequence in which the photographic apparatus of FIG. 3 self-processes film dispensed from its cooperating cassette type magazine.

FIG. 12 is a perspective view of a cassette type magazine according to the present invention constructed for being loaded with one photographic medium assemblage of the type shown in FIGS. 1 and 2.

FIG. 13 is a perspective view of another embodiment of cassette type magazine according to the present invention constructed for being loaded with one photographic medium assemblage of the type shown in FIGS. 1 and 2.

FIGS. 15 through 19 are plan views of portions of the photographic apparatus of FIG. 14 illustrating the sequential operation thereof.

FIG. 20 is a side view of the motors, gearing and other mechanism contained in the photographic apparatus of FIG. 14 which are energized and driven to advance and process film therein.

FIG. 21 is an alternate form of photographic assemblage.

DETAILED DESCRIPTION OF THE PREFERRED EMBODIMENTS

Figure 4:
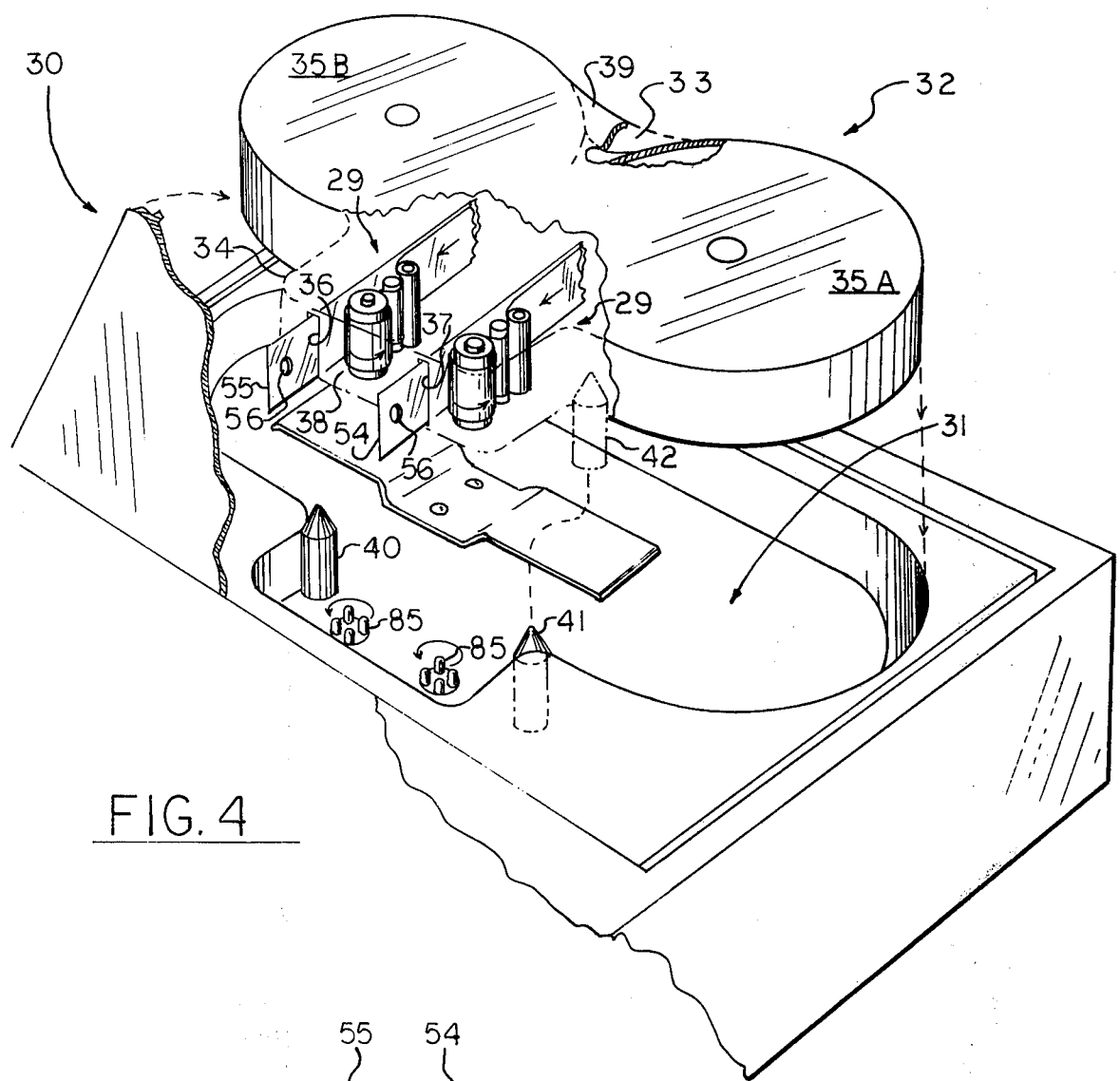
FIG. 4 is a partially cutaway perspective view of the photographic apparatus of FIG. 3 illustrating the manner in which the cooperating cassette type magazine is loaded therein.

Referring to the drawings in more detail, there is shown in FIGS. 1 and 2, respectively, photographic medium assemblages or laminates generally identified by the numerals 10 and 11. The assemblages 10 and 11 are similarly constructed, each being made up of a plurality of separate elongate backing strips 12 each carrying photographic medium 13 and interconnected by a continuous sealing strip 14. The photographic medium on each backing strip 12 in FIG. 1 is a rectangular strip of film having a selected number of frames, such as ten, and is identified by the numeral 13A. The photographic medium on each backing strip in FIG. 2 is a rectangular length of photodeveloping material or agent suitable for developing the film 13A and is identified by the numeral 13B. The photodeveloper 13B has substantially the same width and length as the film 13A so that the photodeveloper 13B may be moved into aligned contact or registry therewith to develop the film 13A.

The photographic medium 13 is centrally secured in a conventional manner on each backing strip 12, with its photosensitive or photoactive side facing outwardly. Each backing strip 12 is made of semi-flexible material having a width equal to or preferably slightly wider than the medium 13 and a lengthwise dimension a predetermined distance longer than the length of the medium 13. Thereby, two end portions 15 are defined on each end of the backing strips 12 to which may be secured the sealing strip 14 (see also FIGS. 13 and 21).

The length of the sealing strip 14 is aligned with the lengths of the serially arranged backing and photographic medium strips as apparent from FIGS. 1, 13 and 21.

In each assemblage 10, 11, the backing strips 12 are interconnected by the continuous sealing strip 14 in a longitudinally aligned end to end relationship with the backing strips 12 positioned so that the photographic media 13 are positioned on the same side of the assemblage formed. The sealing strip 14 interconnects the backing strips 12 by being secured to each backing strip 12 at the pair of spaced apart points defined by the backing end portions 15. The continuous strip 14 is secured to these end portions 15 in a conventional peel-away type bond so that the continuous strip 14 may be peeled therefrom to dispense individual backing strips 12 carrying photographic medium 13.

The continuous strip 14 is a flexible opaque protective covering material, has a width equal to or greater than the width of the outwardly facing photosensitive portion of the media 13, and is secured in longitudinal alignment with the backing strips 12 to cover over the media 13 thereon. Thereby, the continuous strip 14 defines a seal which isolates the photographic medium 13 on each backing strip 12 from light and foreign matter.

It is noted that sealing strip 14 is more flexible than the backing strips 12 so that the strip 14 may be peeled therefrom by being rolled on a take-up roller without causing any significant flexure of the backing strips 12.

Thereby, the backing strips 12 are dispensed from an assemblage in a substantially flat state whenever the sealing strip 14 is peeled therefrom.

Referring to FIGS. 3 through 11, a self-processing type photographic microfilm camera apparatus generally identified by the numeral 30 is there shown.

As shown in FIGS. 3, 4 and 6, a cassette compartment 31 is defined in one end of the camera 30. The cassette compartment 31 is constructed to receive a cassette 32 having a dumbbell shaped body portion. The cassette 32 has centrally defined on opposite sides thereof a guide pin recess 33 and a rectangular extension 34. Each end of the cassette 32 defines a cylindrical housing, identified by the designations 35A, 35B, for holding a photographic medium assemblage of the type 10, 11 hereinbefore described, and the rectangular extension 34 houses take-up roller mechanism 29. The take-up roller mechanism 29 may be selectively driven to dispense backing strips 12 carrying photographic medium from the slots 36, 37 defined in the end face 38 of the cassette extension 34.

The cassette 32 is loaded into the cassette compartment 31 by interfitting its rectangular extension 34 between guide pins 40, 41 and inserting guide pin 42 into the guide pin recess 33 formed in the cassette.

Thereby, the cassette 32 is held in a properly orientated position for dispensing film strips 13A and photodeveloper strips 13B therefrom into the film processing portion of the camera 30. The photodeveloper strips are hereinafter referred to as web strips. Once the cassette 32 is loaded into the camera 30, the light-tight door 43 is closed and locked close to shut the cassette compartment 31. The door 43 and its locking nut 44 are illustrated in the closed position in FIG. 6. It is noted that the cassette 32 cannot be inserted upside down because of the flange 39 closing one end of the guide pin recess 33.

Figure 5:
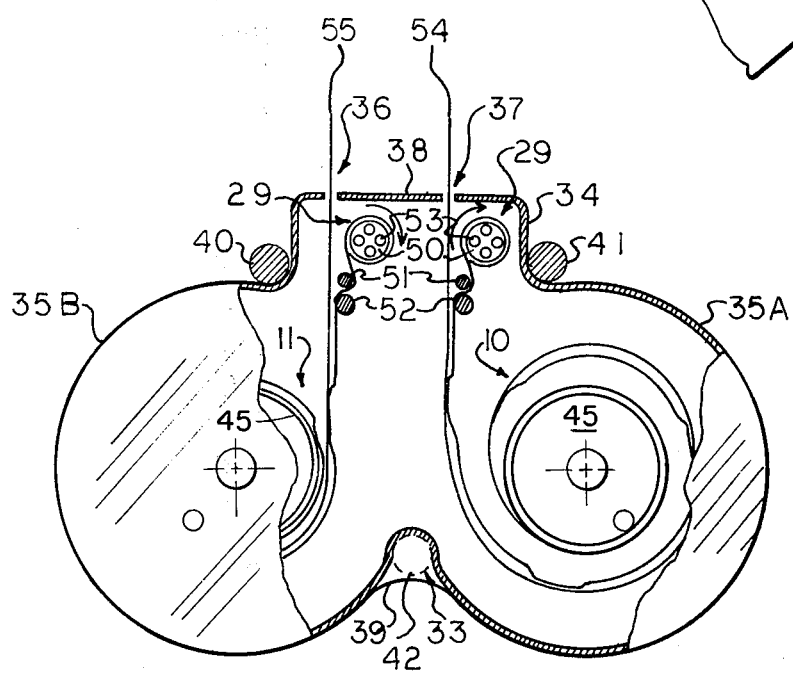
FIG. 5 is a partially cutaway bottom plan view of the cassette type magazine of FIG. 3 illustrated loaded with the photographic medium assemblages of FIGS. 1 and 2.

Referring to FIG. 5, the film laminate or assemblage 10 is illustrated loaded in chamber 35A of the cassette 32 and the photodeveloper or web assemblage 11 is loaded in the chamber 35B. The assemblages 10 and 11 are wrapped around rotatable bobbins 45 centrally mounted in the chambers 35A, 35B to be dispensed therefrom along paths substantially in alignment with the discharge slots 37, 36, respectively.

The sealing strips 14 of the assemblages 10 and 11 are engaged by the take-up roller mechanisms 29. Each mechanism 29 is made up of a drive roller 50 and guide rollers 51, 52. The guide rollers 52 guide the continuous strips 14 onto the drive rollers 50 and the strips 14 are secured around the drive rollers 50 to be wrapped thereon by rotation of the drive rollers 50.

The rollers 50, which may be also called the seal disposal rollers, are driven in the direction of rotation indicated by the arrows in FIG. 5 and have drive engagement holes 53 formed in their end.

As shown in FIGS. 3, 5 and 6, the assemblages 10 and 11 are loaded in the cassette 32 with the leading ends 54, 55, respectively, of their lead backing strips 12 projecting a predetermined distance from the slots 37, 36. Holes or openings 56 are formed adjacent to the end edge of each backing strip 12 and preferably centrally therein for providing means for gripping each backing strip 12 and moving it through the camera mechanism.

Figure 8:
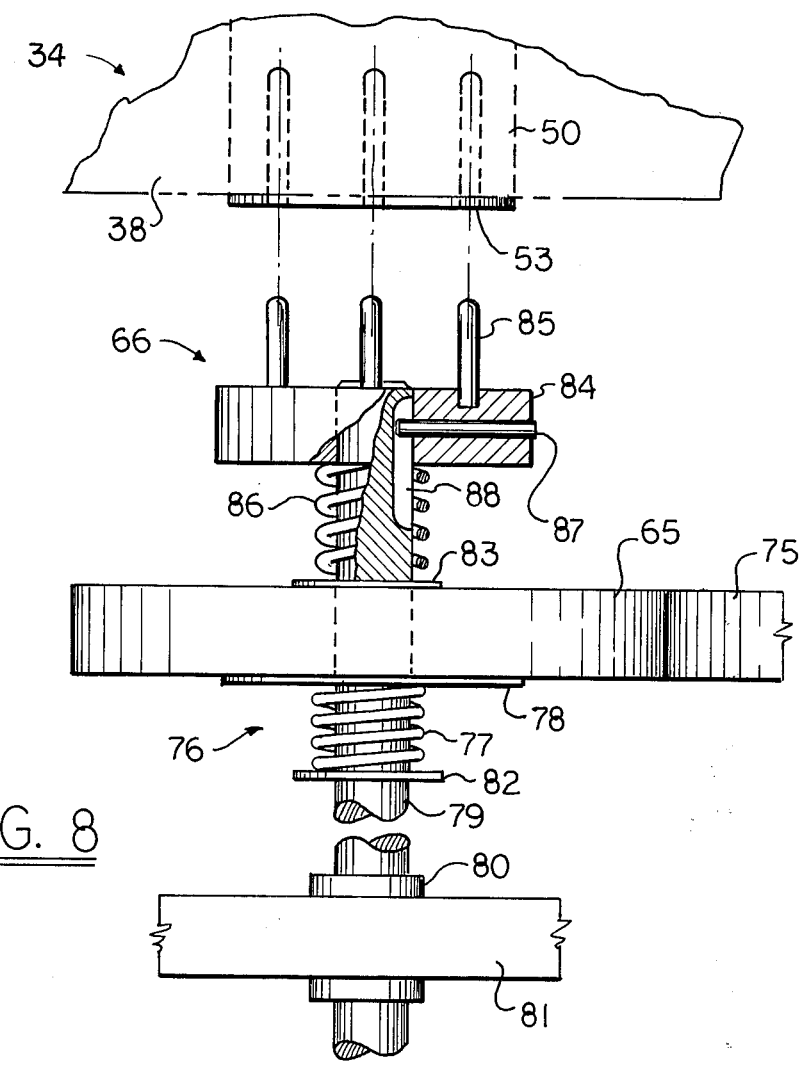
FIG. 8 is an enlarged side view of a portion of the driving mechanism of FIG. 7.
Figure 7:
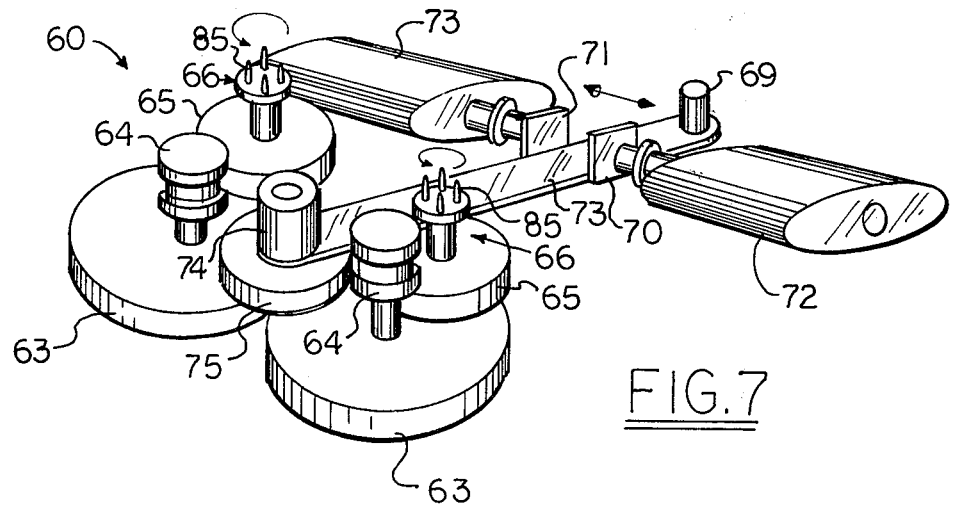
FIG. 7 is a perspective view of the mechanism in the photographic apparatus of FIG. 3 for driving take-up rollers in the cooperating cassette type magazine to dispense strips of film and photodeveloping material therefrom.

The mechanism for selectively loading on command film strips 13A or web strips 13B from the cassette 32 into the camera 30 is shown in FIGS. 6, 7 and 8. This mechanism is generally identified by the numeral 60 and includes a motor gear 61, on idle gear 62; web and film pincher drive gears 63 having pincher or pressure rollers 64 mounted thereon; web and film pin drive gears 65 carrying drive pin mechanisms 66; and a pivotal lever mechanism 67. The lever mechanism 67 is pivotally mounted at its end remote from the gears 63, 65, and extends from pivot point 69 between solenoid striker plates 70, 71, the drive gears 65 and the pressure rollers 64. The solenoid striker plates 70 and 71 are mounted on web and film loading solenoids 72 and 73, respectively.

Mounted on the end of the lever arm 67 remote from its pivot 69 are a pincher or pressure roller 74 and a drive gear 75. The roller 74 and gear 75 are rigidly connected for coordinate rotation and are positioned to be simultaneously pivoted into engagement with either the web pressure roller 64 and the web pin drive gear 65 or the film pressure roll 64 and the film pin drive gear 65.

FIG. 8 illustrates one of the pin drive gears 65 with the slip clutch mechanism associated therewith. The slip clutch mechanism is generally identified by the numeral 76 and is made up of a clutch load spring 77 and clutch pad 78 positioned on gear shaft 79. The gear shaft 79 is rotatably mounted by bushing 80 in a support plate 81 and has a fixed spring retainer member 82 formed thereon which supports the clutch load spring 77. The spring 77 urges the clutch pad 78 against the gear 65 to push the gear 65 against fixed retainer member 83. Thereby, the drive gear 65, which is freely rotatable relative to the shaft 79, is held in a fixed position thereon by the action of the slip clutch 76.

The drive pin mechanism 66 is shown in more detail in FIG. 8 and includes a cylindrical plate 84, drive pins 85 and a load spring 86. The drive pins 85 extend from the plate 84 in position for mating with the drive pin holes 53 in the lower end of the seal disposal roller 50 when aligned therewith.

The plate 84 is slidably mounted for up and down movement on the gear shaft 79 by a pin 87, which rides in a slot 88 formed in the shaft 79. The spring 86 is positioned between the fixed retainer member 83 and the plate 84, and operates to bias the plate towards the end of the shaft 79 away from the gear 65.

Upon insertion of a cassette 32 into the cassette compartment 21, as shown in FIG. 4, the cassette 32 forces the drive pins 85 into the housing of the camera 30 to depress the pin supporting plates 84 on the shafts 79 whenever the drive pins 85 are not in alignment with the drive pin holes 53. Once the shafts 79 are driven, however, the drive pins 85 will be forced into the holes 53 in the inner ends of the cassette seal disposal rollers 50 when they are rotated into alignment therewith due to the biasing force of the load springs 86 on the plates 84. Thus, the rotating drive pin assemblies 66, when rotated, automatically seek and align themselves with the pin drive holes 53 in the seal disposal rollers 50.

Mechanically, the mechanism 60 shown in FIGS. 6 through 8 operates in the following manner to load on command a film strip 13A or web strip 13B from the cassette 32 into the camera 30. As before mentioned, the ends of the backing strips 12 projecting from the slots 36, 37 in the cassette 32 extend therefrom a predetermined distance.

This predetermined distance is designed to be slightly greater than the distance from the center of the pressure rollers 64 to the cassette end face 38 so that the backing strips 12 extending from the slots 37 are positioned on either side of the pressure roller 74 in position to be pinched between the pressure roller 74 and either the web or film pincher roller 64.

Figure 10:
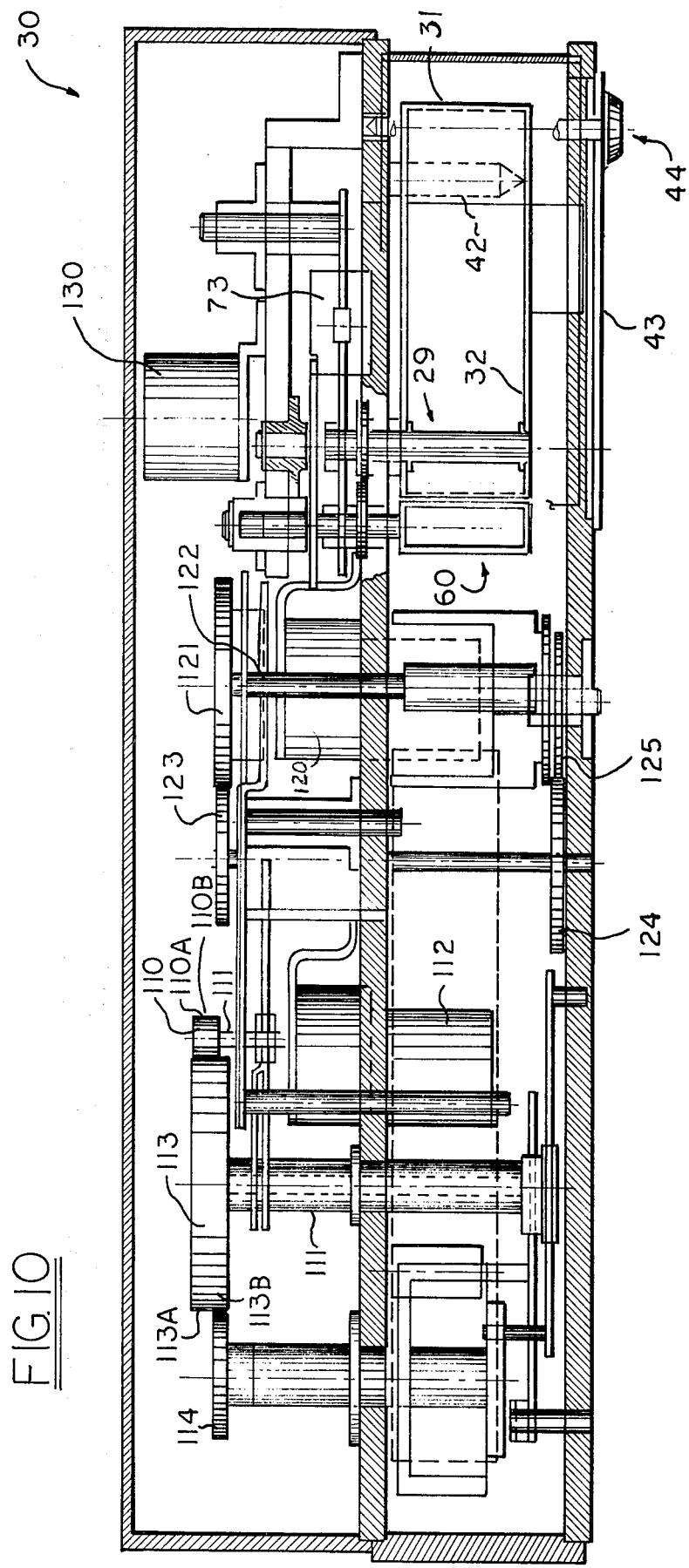
FIG. 10 is a side view of the photographic apparatus of FIG. 3 illustrating the motors, gearing and other mechanism contained therein which are energized and drives to advance and process film therein.

To dispense a backing strip 12 carrying a film strip 13A from the cassette slot 37, the motor 130, shown in FIG. 10 and which drives motor gear 61, and the film loading solenoid 72 are simultaneously actuated. The motor gear 61 drives the film pincher roller drive gear 63 and actuation of the film loading solenoid 73 forces the striker plate 71 against the lever arm 67 to move the roller 74 and gear 75 into engagement, respectively, with the film pincher roller 64 and the film pin drive gear 65.

Thus, the extending end of the backing strip carrying the film strip 13A is pinched between the roller 74 and the film pinch roller 64 with the result that the film strip 13A is dispensed from the cassette slot 37 by the action of the rotation of the film pinch roller 64 thereagainst, which, in turn, causes rotation of the pressure roller 74 and driving of the seal take-up mechanism 29 associated therewith through the meshed gears 75 and 65. Rotation of the drive pin mechanism 66 in combination with the pulling force of the rollers 74 and 64 on the strip 13A provides sufficient force to peel the sealing strip 14 off the backing strip 12.

Each time a film strip 13A is dispensed from the cassette 32, the film assemblage 10 is advanced until the hole 56 in the lead edge of the dispensed backing strip 12 engages spring loaded pin 81, shown in FIG. 3 on drum 82, to rotate it to actuate film load stop switch 83, shown in FIG. 6. Actuation of switch 83 turns off the motor 80 driving motor gear 61 and de-energizes film solenoid 73. At this instant, the lead end of the backing 12 of the next film strip 13A is positioned between these rollers 64 and 74.

It is noted that the slip clutch mechanism 76 associated with the drive pin assembly 66 prevents additional seal 14 from being pulled off the backing strip 12 than that which is supplied thereto by the pull of the rollers 64, 74 on the backing strip 12. Thus, once the motor driving the motor gear 61 is stopped due to the actuation of the film load stop switch 83, the clutch 76 slips to stop any additional advancement of the film assemblage 10 which could be caused by rotational momentum of the pin drive gear 65.

The mechanism 60 operates on command in a similar manner to dispense a web strip 13B carrying photodeveloper with the following differences. The web pincher drive gear 63 is driven by motor gear 61 through idle gear 62 instead of being directly driven thereby. The web pinch roller 64 is recessed in the portion aligned with the photodeveloper on the web strip 13B so as to not touch the photodeveloper. Rather, the roller 64 touches the backing strip 12 along its side edges.

Further, the web solenoid 72 is actuated instead of the film solenoid 73 and a web load stop switch 84, shown in FIG. 3, is actuated by the dispensed web strip 13B to simultaneously de-energize the motor 130 driving motor gear 61 and the web solenoid 72.

It is noted that while the pinch roller method of transferring film and web strips is very reliable, if a very positive mechanism is required, rollers 64 and 74 could be replaced by sprockets and matching sprocket holes could be formed in the film and web strips 13A, 13B.

Referring to FIGS. 3 and 6, the mechanism in the camera 30 is there illustrated for processing the film and web strips 13A and 13B in accordance with the operational sequence set forth in the flow diagram of FIG. 9.

As shown in FIG. 3, the film strip 13A is first advanced to a waiting area defined by plate-like structure 90, 91. Next, the drum 82 is rotated in a step corresponding to one frame of the film 13A to move a frame of the film 13A into an expose position aligned with the lens 92. The film pressure plate 93, shown in FIG. 6, on lever arm 94 is then lowered and the shutter associated with the lens 92 is actuated to expose the film frame. The pressure plate 93 then lifts and the drum 82 rotates to move the next film frame in sequence into the expose position to await an exposure command.

It is noted that the lever 94 which operates the film pressure plate 93 is selectively actuated by the cam mechanism 95. The cam mechanism 95 in turn actuates coordinately the associated switch 96.

Once all frames of the film strip 13A have been exposed, the drum 82 rotates to transfer the exposed film strip 13A into the station defined by plate-like structure 97, 98. Next, a web strip 13B is dispensed into the station defined by plate-like structure 98, 99, thereby to be positioned in an aligned separated position over the film strip 13A with the photodeveloper facing towards the exposed photosensitive portion of the film 18A.

Next, the lever mechanism 102 shown in FIG. 6 is actuated to pivot the roller 103 upwardly, thereby to pinch the aligned web and film strips between the laminating roller 103 and the laminating roller or drum 104.

With the film and web strips 13A, 13B pinched between these laminating rollers, the roller 103 is driven to cause the film and web strips to be transferred in register around the roller 104 onto the pressure plate 105. Lever arm 1002 is then actuated by cam 1001. This, in turn, moves the pressure plate 105 toward the door 107.

After a predetermined period of time, the film strip 13A is developed and the door 107 may be opened by gripping the handle 108. The film strip 13A and web strip 13B are then removed through the door 107 and separated. It is noted that the pressure plate 105 can be isolated from the rest of the camera so that the bottom chamber carrying unexposed film is light-tight with respect to the top chamber containing the door 107 through which developed film is removed.

Referring to FIG. 10, the motor and driving mechanism of the camera 30 are there shown. Gear 110 is mounted on shaft 111 of the gear motor 112. The gear 110 consists of two planes 110A and 110B. Plane 110A has one tooth and the rest are removed. Plane 110B has all its teeth. Gear 113 is driven by gear 110. Gear 113 also consists of two planes 113A, 113B. Plane 113A has all teeth left while 113B has one-third of its teeth removed. Gear 114 is driven by gear 113 which in turn drives the film advance drum 82, shown in FIG. 6.

The gears 110, 113 and 114 are designed so that with gear 110A engaged and 110B disengaged, one rotation of gear 110A causes the film advance drum 82 to be driven through gears 113 and 114 the distance of one frame of microfilm. This distance is approximately 0.460 inches.

The gear 110B is engaged once all the film is exposed to drive the drum 82 to transfer the exposed film 13A under transfer roller 115 shown in FIG. 6 onto the plate 97. It is noted that during such transfer, the film pressure pad 93 is at all times in a raised position. During this film transfer rotation cycle of the drum 82, detent mechanism associated therewith to program the film advance steps of one frame is disabled to permit smoother rotation of the drum 82.

The motor 120 shown in FIG. 10 is actuated by a switch and operates to drive laminating roller 104 through gears 121, 123, 124 and 125. The gear 121 is mounted on gear-box shaft 122 of motor 120. The gears 123, 124 are mounted on the same shaft and the laminating roller 104 is mounted on the same shaft as the gear 125.

Also shown in FIG. 10 is the motor 130 which drives the mechanism 60 for selectively transferring on command film and web strips from the cassette 32.

Figure 11:
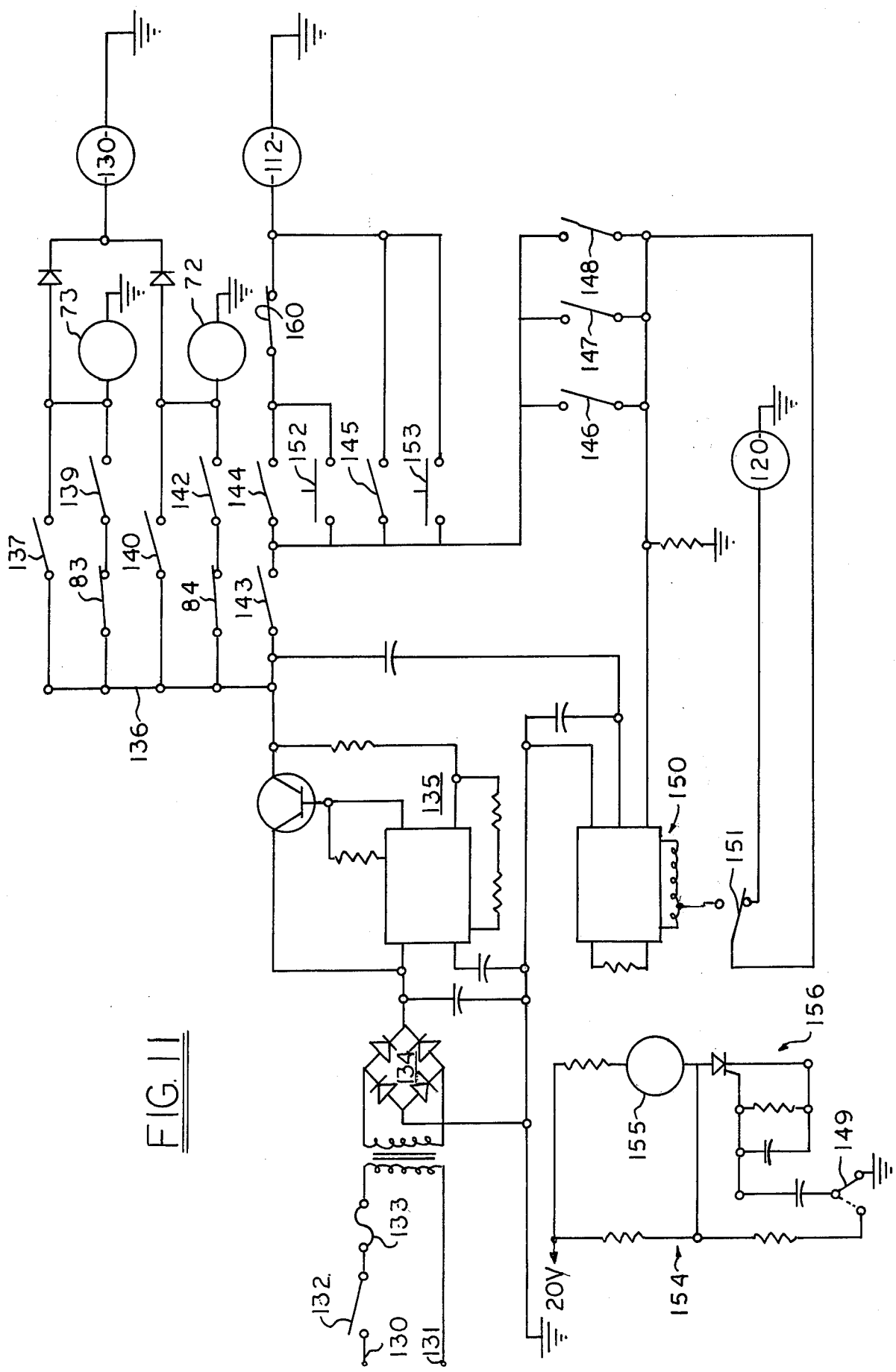
FIG. 11 is a diagram of the electrical circuitry of the photographic apparatus of FIG. 3.

Referring to FIG. 11, the electrical diagram of the self-processing camera 30 is there shown. The electrical circuitry is supplied with AC power at circuit points 130, 131, and includes an on-off switch 132 and fuse 133 for transferring the AC power to diode bridge 134.

The diode bridge 134 rectifies the AC power to DC. Filter circuit 135 is included to provide a stabilized DC voltage, such as twenty volts, on lead 136. The circuitry includes switches 83, 84, 137, 139-140, 142-149, 151-153 and 160, and an alarm circuit 154. The alarm circuit 154 includes an alarm 155 and driver circuit 156. Also shown in the electrical diagram are the film solenoid 73, the web solenoid 72, and motors 112, 120 and 130.

In operation of the electrical circuitry of the camera 30, the switches perform the following functions. Closure of switch 132 energizes the circuitry. Switch 143 closes upon closure of the cassette compartment door 43 to enable operation of the camera. Momentary closure of switch 152 starts the motor 112 to advance a frame of film into position for exposure. Switch 144 is operated by a cam on the motor 112 and closes when the motor 112 is energized. Switch 160 opens once the last frame of the film strip is exposed and is operated by a cam on the gear 110A shown in FIG. 10.

Closure of switch 153 drives motor 112 to transfer an exposed film strip from the exposure station to the laminating rollers 103, 104. Switch 145 is operated by a cam on the gear 110 and drives the transfer drum 82 into position for receiving the next film strip 13A.

Switch 148 is closed by a cam on the gear 110 to drive motor 120. Thereby, the laminating rollers 103, 104 are driven to transfer the film and web strips in registry to the film pressure plate 105. Switch 147 is closed by a cam on the motor 120 itself to continue the motor driving once energized.

Switch 149 operates when closed to energize the relay coil 150 to briefly close switch 149 to transmit a pulse to the alarm circuit 154 to energize it. This is operated by movement of the pressure plate 105 to its upper position. The circuit 154 operates as a timer to indicate when film has been developed by generating an alarm signal.

Switch 151 is operated by a cam on the motor 120 to stop the motor once the film and web strips have been transferred. Switch 137 and 140 are, respectively, closed to operate the web and film solenoids 73, 72, while simultaneously energizing the motor 130. As earlier mentioned, the motor 130 drives the mechanism which selectively dispenses on command film and web strips from the cassette 32. Switches 137 and 140 are located on the camera control panel.

Switches 83 and 84, as earlier mentioned are actuated by the film and web strips, respectively, once they have been dispensed from the cassette 32. Switches 139 and 142 are located on the solenoids 73, 72, to keep them energized once energized until the film and web strips are completely dispensed.

Thus, there has been described on exemplary embodiment of self-processing photographic apparatus according to the invention.

Illustrated in FIG. 12 is another form of cassette generally identified by the numeral 200. The cassette 200 is designed for holding one photographic medium assemblage and a film medium assemblage 10 is shown loaded therein. The cassette 200 operates in the same manner as the abovedescribed combination cassette 32 and the same identifying numerals with a prime added as used in identifying the parts of the cassette 32 are used to identify corresponding parts in the cassette 200.

FIG. 13 illustrates an alternate embodiment of cassette designed for holding one photographic medium assemblage. This cassette is generally identified by numeral 201.

The cassette 201 has a rectangular housing 202 with a discharge slot 203 defined therein. The slot 203 is defined in the end 204 of the housing 202 adjacent and parallel to the housing corner edge 205.

A photographic medium assemblage 11 is illustrated loaded in the cassette housing 202 by being arranged in a boustrophedonic pattern with each individual web strip 13B piled one upon the other in a superimposed relationship. A take-up roller 206 similar in construction and operation to the hereinbefore take-up roller 50 is illustrated mounted within the housing 202 adjacent and in parallel extending relationship to the slot 203.

In operation of the cassette 201, the take-up roller 206 operates to peel the sealing strip 14 from the backing strips 12 as a web strip 13B is dispensed therefrom. It is noted that due to the relative rigidity of the backing strips 12, the winding of the sealing strip 14 on the seal disposal roller 206 operates to automatically align the backing strips 12 with the slot 203 for dispensing therethrough.

It is noted while the sealing strips 14 are illustrated secured to the backing strips 12 at spaced apart points on the ends thereof, that the sealing strips could also be attached thereto at other suitable spaced apart points, such as along the side edges of the backing strips 12.

An alternate embodiment of self-developing photographic camera apparatus is illustrated in FIGS. 14 through 20. This apparatus is generally identified by the numeral 300 and is constructed for use with two of the cassettes 200.

In the drawing Figures, the cassettes loaded with a film assemblage 10 is identified by the numeral 200A and the cassette loaded with a web or photodeveloper assemblage is identified by the numeral 200B.

In operation of the camera apparatus 300, the film and web cassettes 200A, 200B are loaded into the camera 300. A film strip 13A is dispensed on command from the cassette 200A by selectively driving the motor 301, shown in FIG. 20. The motor 301 drives the pin driver 302, engaging the seal disposal roller 50' through gears 303, 304 and 305. A slip clutch 306 is associated with the gear 305.

Figure 14:
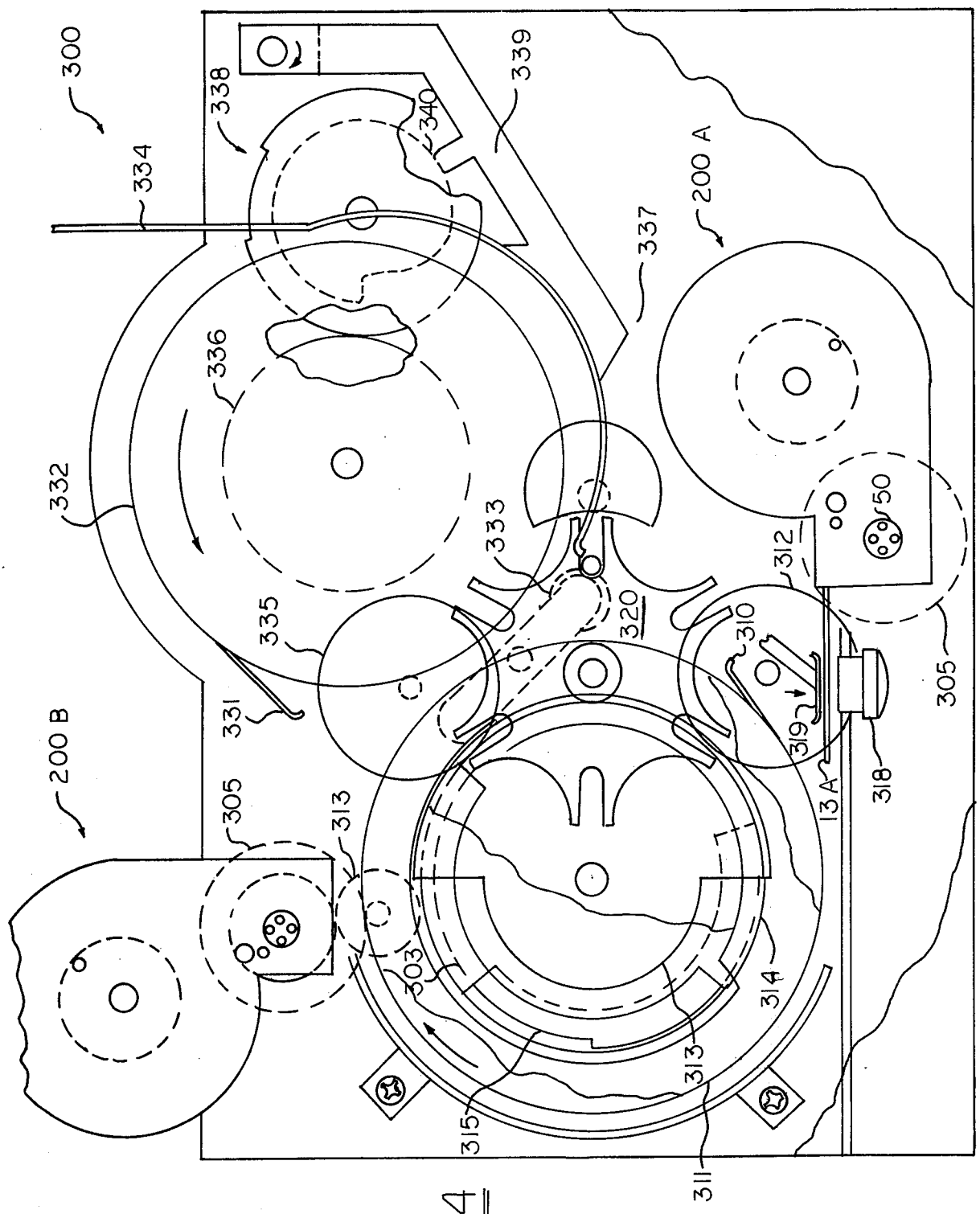
FIG. 14 is a plan view of another embodiment of photographic apparatus according to the present invention which uses two of the cassette type magazines shown in FIG. 12 and which is cutaway to illustrate internal construction.
Figure 18:
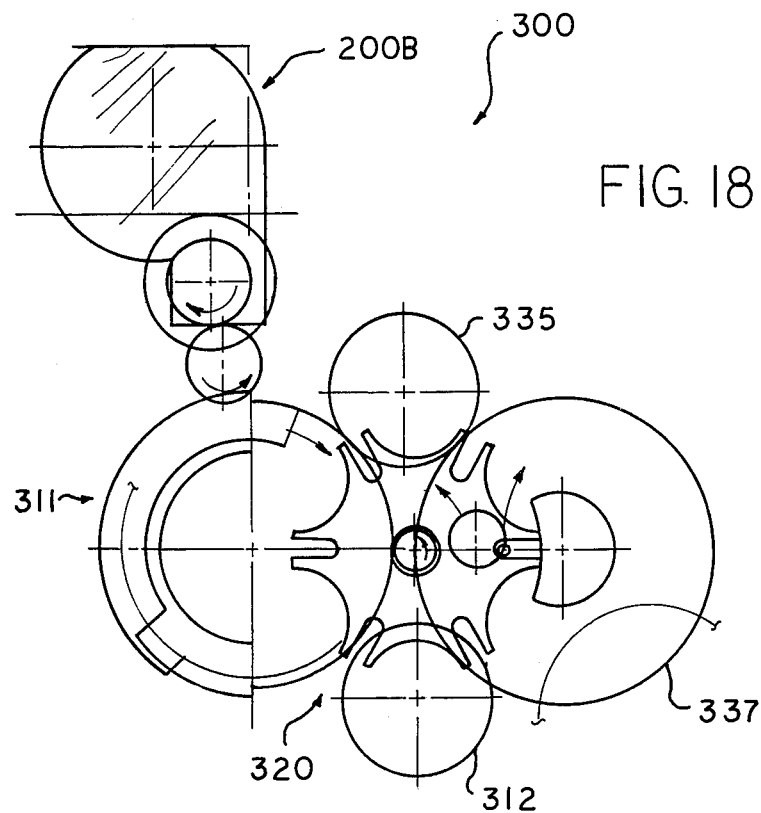

Pinch roller mechanism in the camera 300 transforms the film strip 13A to hook 310 which is positioned on transfer drum 311. This seal take up mechanism is driven through gear mechanism 312. Partial gears 313, 314 and 315, shown mounted on star drive shaft 317 in FIG. 20 are selectively driven by motor 301 to advance the frames of the film strip 13A into alignment with the camera lens 318 and the film frames are sequentially exposed. The film pressure plate 319, associated with the camera lens 318, is shown in FIG. 14.

Upon exposure of the last frame of the film strip 13A, the hook 310 has been moved into engagement with the hole in the end of the web strip 13B so that the web strip 13B is picked up and pulled from the cassette 200B in register with the exposed film strip 13A.

It is noted that it is the Geneva star gear mechanism 320 also mounted on shaft 317 which operates to sequentially rotate the transfer drum 311 in steps equal to the distance of one film frame.

The motor 330 shown in FIG. 20 is now driven to rotate hook 331 on transfer drum 332 into engagement with the holes in the aligned web and film strips. Thereby, the superimposed film and web strips are transferred between laminating roller 333 and the drum 332 and advanced therefrom into the developing position between pressure plate 334 and drum 332. The transfer drum 332 and laminating roller 333 are driven through operation of the gears 335 and 336 mounted on the shaft of the motor 330, and the gear 337.

Figure 19:
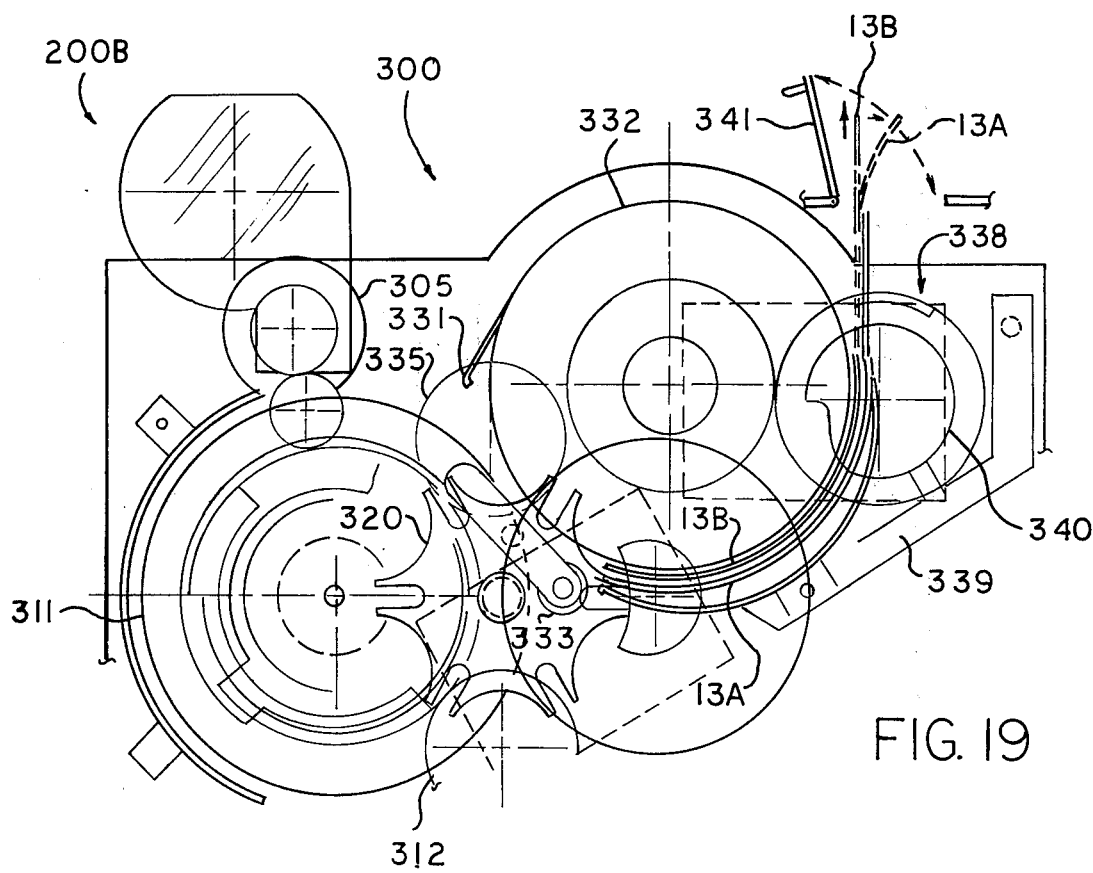

With the superimposed film and web strips 13A, 13B positioned between the drum 332 and pressure plate 334, partial gear 338 is driven to actuate pressure plate actuator 336. Pressure plate actuator 339 moves pressure plate against drum 332 to press the exposed film strip 13A and the photodeveloper on web strip 13B in contact to develop the film. The rotation rate of the pressure plate actuator cam 340 determines the time the film is developed and this cam operates to move the pressure plate 334 away from the drum 332 once this period of time has expired. The developed film strip may then be gripped and removed from the camera 300 through the door 341, as shown in FIG. 19.

It is noted that the operation of the camera 300 may be programmed by electrical circuitry similar to that described in connection with camera 30. Further, the operation of the camera 300 corresponds to that of the camera 30. The more significant structural differences between the cameras 30 and 300 are the following. The camera 300 is designed for using separate film and web cassettes 200A, 200B rather than a combination cassette 32. The camera 300 uses a Geneva star mechanism 320 for advancing the film strip 13A one frame at a time for exposure. The exposed film is developed in camera 300 by pressing the film and web strips together on a curved, rather than flat, surface. Other than these differences, the cameras 30 and 300 are very similar in construction and operation.

Although the invention has been herein shown and described in what is conceived to be the preferred embodiments, it is recognized that departures may be made therefrom within the scope of the invention.

An alternate form of photographic medium assemblage is shown in FIG. 21. This assemblage is generally identified by the numeral 400 and differs from the earlier described assemblages 10, 11 in that the continuous sealing strip 14 is secured in a peel away type seal to the backing strips 12 along their side lateral edge portions as well as on their end portions. The peel away type seals are shown in dotted lines, from a continuous seal around the photographic medium 13 and are identified by the numeral 401.

I claim:

1. A cartridge-type photographic medium comprising in combination:
    a cartridge housing having first and second openings for discharging photographic media;
    a first photographic medium assemblage located in said cartridge housing and comprising:
    a plurality of separate first elongate backing strips for photographic film;
    a plurality of separate strips of said photographic film located on said first backing strips; and
    means for interconnecting said first backing strips and covering said photographic film strips, comprising a first single continuous strip extending over at least the entire length of each photographic film strip and being attached to each of said first backing strips at least at two spaced portions of each first backing strip located, respectively, adjacent opposite ends of said length; and means for successively separating said first single continuous strip from said first backing strips and photographic film strips and for propelling said separated first back strips and photographic film strips through said first cartridge housing opening, said separating and propelling means including first means in said cartridge housing for successively pull and first continuous strip away from each of said first backing strips and for storing said pulled-away first continuous strip inside said cartridge housing; and a second photographic medium assemblage located in said cartridge housing and comprising:

a plurality of separate second backing strips for a photographic developer medium;

a plurality of separate strips containing said photographic developer medium; and means for interconnecting said second backing strips and covering said developer medium strips, comprising a second continuous strip extending over at least one entire dimension of each developer medium strip and being attached to each of said second backing strips at least at portions of each second backing strip located adjacent opposite ends of said dimension; and means for successively separating said second continuous strip from said second backing strips and photographic developer medium strips and for propelling said separated second backing strips and said photographic developer medium strips through said second cartridge housing opening, said separating and propelling means including second means in said cartridge housing for successively pulling said second continuous strip away from each of said second backing strips and for storing said pulled-away second continuous strip inside said cartridge housing.

2. A cartridge-type photographic medium as claimed in claim 1, wherein:
said first pulling means is located in said cartridge housing adjacent said first cartridge opening.

3. A cartridge-type photographic medium as claimed in claim 1, wherein:
said first pulling means includes means for winding said first continuous strip in said cartridge housing.

4. A cartridge-type photographic medium as claimed in claim 1, wherein:
said first photographic medium assemblage including said first single continuous strip, said first backing strips and said photographic film strips is wound in a roll in said cartridge housing.

5. A cartridge-type photographic medium as claimed in claim 1, wherein:
each of said first backing strips defines means for facilitating the removal from said first continuous strip.

6. A cartridge-type photographic medium as claimed in claim 1, wherein:
said first backing strips with said photographic film strips are arranged serially on said first single continuous strip.

7. A cartridge-type photographic medium as claimed in claim 6, wherein:
said photographic film strips are narrower than said first backing strips and are arranged on said first backing strips to leave free lateral portions on opposite sides of each first backing strip; and
said first single continuous strip is attached to said free lateral portions on opposite sides of each and all of said first backing strips.

8. A cartridge-type photographic medium as claimed in claim 6, wherein:
said first single continuous strip extends over the entire width of each photographic film strip.

9. A cartridge-type photographic medium as claimed in claim 8, wherein:
said first single continuous strip is attached to each of said first backing strips at opposite sides thereof.

10. A cartridge-type photographic medium as claimed in claim 1, wherein:
said photographic film strips are shorter and narrower than said first backing strips and are arranged on said first backing strips to leave a free margin along the periphery thereof; and
said first single continuous strip extends over the entire length and the entire width of each photographic film strip and is sealed to each first backing strip along said periphery.

11. A cartridge-type photographic medium as claimed in claim 1, wherein:
said first single continuous strip and said first backing strips constitute closed pockets for said photographic film strips.

12. A cartridge-type photographic medium as claimed in claim 1, wherein:
said second continuous strip and said second backing strips constitute closed pockets for said photographic developer medium strips.

13. A cartridge-type photographic medium as claimed in claim 1, wherein:
each of said first backing defines an aperture adjacent one end thereof.

14. A photographic medium assemblage as claimed in claim 1, wherein:
each of said second backing strips defines an aperture adjacent one end thereof.

* * * * *